United States Patent [19]
Meier et al.

[11] Patent Number: 4,567,481
[45] Date of Patent: Jan. 28, 1986

[54] MEASURING INSTRUMENT DISPLAY WITH EXCHANGEABLE LEGENDS FOR DIFFERENT LANGUAGES OR OPERATING MODES

[75] Inventors: Linus Meier, Saland; Roland Hanselmann, Hegnau, both of Switzerland

[73] Assignee: Mettler Instrumente AG, Greifensee, Switzerland

[21] Appl. No.: 461,439

[22] Filed: Jan. 27, 1983

[30] Foreign Application Priority Data

Mar. 19, 1982 [CH] Switzerland .......................... 1710/82
Sep. 10, 1982 [CH] Switzerland .......................... 5391/82

[51] Int. Cl.⁴ .......................... G09G 3/02; G09G 3/18; G09G 3/36
[52] U.S. Cl. .......................... 340/784; 340/716; 340/765; 340/759
[58] Field of Search .............. 340/756, 757, 759, 765, 340/763, 774, 779, 784, 716

[56] References Cited
U.S. PATENT DOCUMENTS

| | | | |
|---|---|---|---|
| 3,652,891 | 3/1972 | Janning | 340/759 X |
| 3,810,168 | 5/1974 | Nishina | 340/757 |
| 4,020,627 | 5/1977 | Yoshida et al. | 340/765 |
| 4,173,757 | 11/1979 | Hareng et al. | 340/765 |
| 4,184,153 | 1/1980 | Glaubitz | 340/765 |
| 4,243,986 | 1/1981 | Nixon | 340/756 |
| 4,302,086 | 11/1981 | Suzuki et al. | 340/765 X |
| 4,334,219 | 6/1982 | Paülus et al. | 340/365 UL X |
| 4,371,870 | 2/1983 | Biferno | 340/716 |

*Primary Examiner*—Gerald L. Brigance
*Assistant Examiner*—Vincent P. Kovalick
*Attorney, Agent, or Firm*—Erwin S. Teltscher

[57] ABSTRACT

In addition to the normal weight display, a display for a balance has a number of other areas in each of which a word indicative of an operation which has been or may be carried out is displayed. The words to be displayed are arranged on an exchangeable card which may be inserted into the balance. Light from each particular area of the card is transmitted or blocked by application of control signals to a liquid crystal which is interposed between the card and the operator's view. The control signals are applied in accordance with the program being carried out and with signals derived from operator controlled keys. The display may be used to direct the operator, since only the operations possible at any particular time are visible. The cards may be imprinted in any language or type of letters, without requiring any change in the remainder of the balance or display. When different legends are to be displayed for different operating modes of the instrument, each card is provided with machine readable symbols so that the program is modified in accordance with the inserted card.

17 Claims, 7 Drawing Figures

MEASURING INSTRUMENT DISPLAY WITH EXCHANGEABLE LEGENDS FOR DIFFERENT LANGUAGES OR OPERATING MODES

CROSS REFERENCE TO RELATED APPLICATIONS AND PUBLICATIONS

Fed. Rep. of Germany O.S. No. 25 36 045, which is hereby incorporated by reference into the present application.

FIELD OF THE INVENTION

The present invention relates to displays for measuring instruments and, more particularly, to displays for balances. Even more particularly, it relates to displays for balances which may be operable in a plurality of modes and/or for which a display in different languages may be desirable.

BACKGROUND OF THE INVENTION

A balance in which the display includes not only the measured value, but also words such as "print" and "tare" is shown in O.S. No. 25 36 045 of the Federal Republic of Germany. The display illustrated therein also includes a number of contact switches for operator control of the balance. However, in any one area of the display only one word, legend, or symbol can be displayed. Enough areas must thus be provided to accommodate all displays required for different operating modes or computations. This is a distinct disadvantage for modern balances which often carry out functions in addition to furnishing the actual measured weight. For example, balances used in stores may also display the price of the units being weighed. In other cases, it may be required to compute the number of units being weighed from the total weight or to furnish the weight in different units. Selectable operating modes of a particular scale may also include such things as calibration, different weight ranges, etc. To accommodate many of these in one display would lead to an excessively large display in the conventional unit illustrated in the above-identified publication. Further, the known display can only be in one language. If a balance were to be manufactured for use in many countries, individual displays would have to be manufactured for each country.

SUMMARY OF THE INVENTION

It is an object of the present invention to furnish a display in which, at any given time, only words or symbols indicative of a presently selected operating condition, or a possible or required action to be taken by the operator are displayed in addition to the display of the actual measured value. This causes a decrease in operator errors, since the actions of the operator are, at least in part, controlled by the displayed words or legends.

Additionally, manufacture of the display is to be independent of the particular language used in the display, exchangeable units being provided to accommodate different languages.

In accordance with the present invention, symbol carrying means are provided which carry at least one alpha-numeric symbol in a predetermined area, the symbol constituting a legend to be displayed. Blocking means are provided which have a preselected area aligned with the predetermined area of the symbol carrying means and which block or transmit light from the symbol carrying means in accordance with a control signal applied thereto. The control signal is applied to the preselected areas so that the symbol becomes visible at the proper times during operation of the measuring instrument. The preselected area in the blocking means thus constitutes a "window" which is opened only when the symbol to be displayed should be visible to the operator.

Preferably, the symbol carrying means is an exchangeable unit, such as a card, which has a reflecting surface on which all the symbols or legends for a particular language and/or operating mode are printed. The blocking means is then constituted by a liquid crystal with two polarizers. Different languages can readily be accommodated by use of different cards, without any changes in the display or the control circuitry of the balance. Where the different cards are used for different operating conditions, each card must carry identifying symbols which are readable by circuitry provided in the measuring instrument and, after being scanned and decoded, control the operation of the measuring instrument.

Preferably, only a single liquid crystal layer is used. The polarizers associated with the display of the measured value are then polarized at right angles to each other, while the polarizers associated with the areas blocking and transmitting light from the corresponding areas of the exchangeable cards are polarized parallel to one another. This particular arrangement results in improved readability for the operator.

Keys are provided to allow operator control of the measuring instrument and, in part, of the display.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENT

The display of the present invention will be described in conjunction with a balance. While this is a preferred application of the present display, the latter may be used equally well in conjunction with other measuring instruments, for example in the fields of titration or thermoanalysis.

Figure 1:
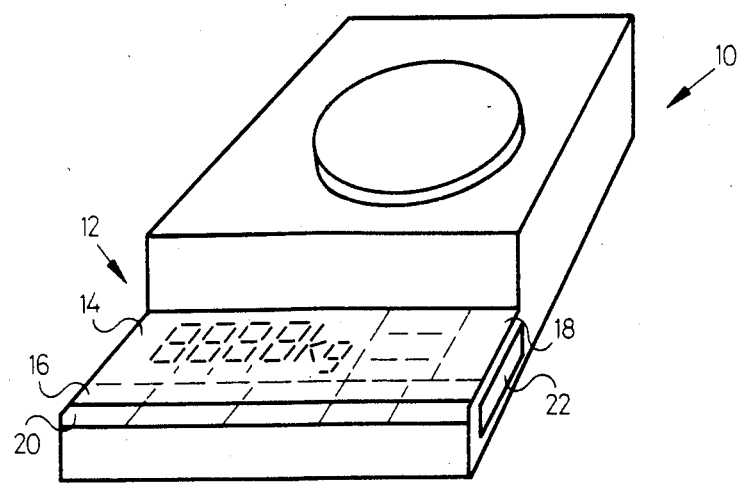
FIG. 1 is an overall view of a balance.

The balance pictured in FIG. 1 can operate in accordance with any number of basic principles. For the present, it is assumed that the balance operates with electro-magnetic force compensation. The display is arranged at the front of the balance. Specifically, the whole display area 12 consists of a number of individual areas 14, 16 and 18. Additionally, a row of keys 20 is provided near the front edge of display 12. The function of these keys will be explained below. Finally, a slot 22, also to be explained below, is visible on the side of balance 10.

Figure 2:
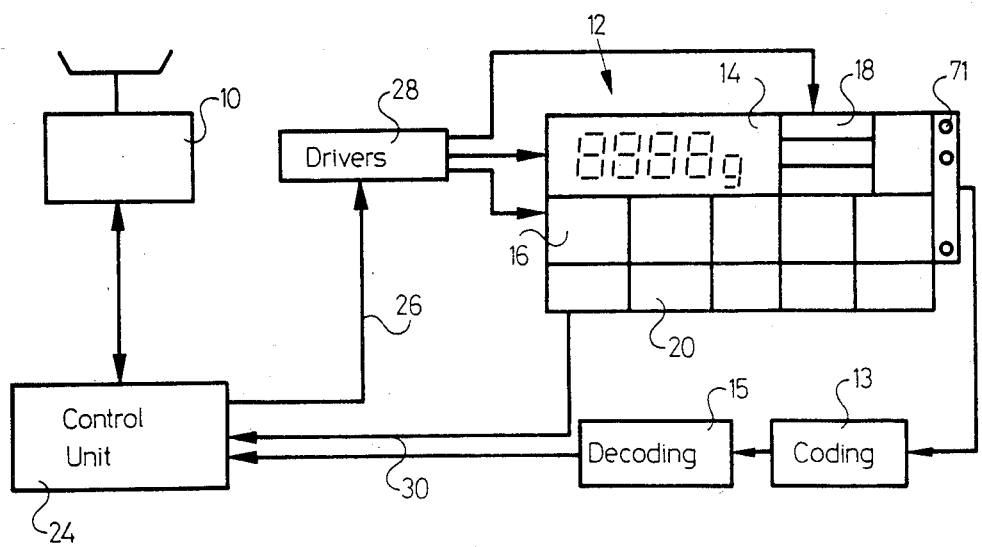
FIG. 2 is a block diagram of components of the balance and display.

FIG. 2 is a schematic block diagram showing components, which, aside from display 12 and its associated controls, are conventional and will not be discussed in detail. A control unit 24 includes all circuits required for computing the weight and controlling the display. Control unit 24 may either be constituted by discrete components, but is, more often, constituted by a programmed microcomputer. Control unit 24 controls driver stages 28 for display 12 via lines 26. Activation of keys 20 causes control signals to be applied to control unit 24 via lines 30.

While the elements in FIG. 2 are all separately indicated in the drawing, it will be assumed for the preferred embodiment that balance 10 includes all of these components in a single housing.

Figure 3:
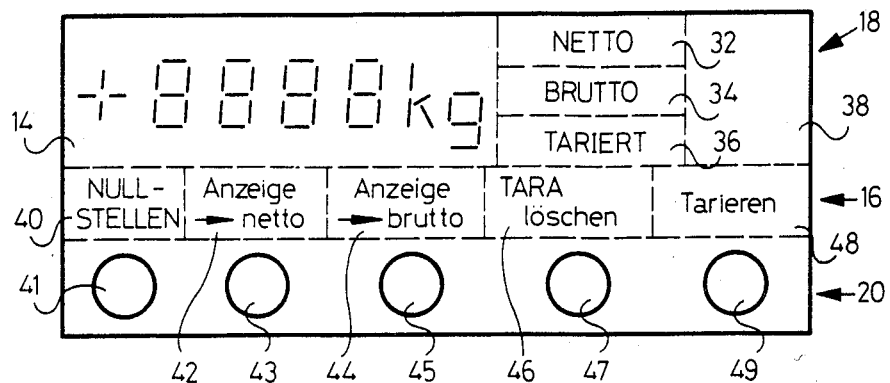
FIG. 3 is a top view of the display.
Figure 5:
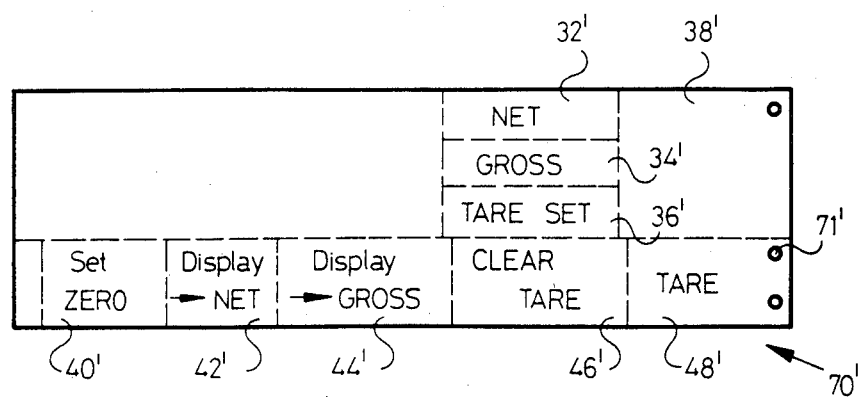
FIG. 5 illustrates a part of the display of FIG. 3 in a second language.

In FIG. 3, display 12 is illustrated with German legends or words. A corresponding English language version is shown in FIG. 5. In FIG. 3, area 14 of display 12 is used for the display of the measured weight, including the sign and the unit (gram or kilogram). Field 18, which adjoins area 14 on the right hand side, is divided into four areas 32, 34, 36 and 38. In the particular embodiment of FIG. 3, area 38 is blank. Areas 32, 34 and 36 carry German language designations corresponding to the English designations "net", "gross", and "tare set" in areas 32' 34' and 36' of FIG. 5. When the legend "net" becomes visible, the then-indicated weight is a net weight. Similarly, if the word "gross" is displayed, the indicated weight is the gross weight. When the legend "tare set" is visible, the operator becomes aware of the fact that a tare operation has been carried out. Area 38' in FIG. 5 is blank, as corresponds to blank area 38 in FIG. 3.

A lower field, designated by reference numeral 16 in FIG. 3, includes areas 40, 42, 44, 46 and 48, respectively designated by the German language equivalent of "zero", "net", "gross", "clear tare", and "tare". Each of these areas is associated with a corresponding key 41, 43, 45, 47, and 49. These keys are not illustrated in FIG. 5, but of course are also present for the English language embodiment.

The word "zero" is visible in area 40: when the weight on the scale is less then a predetermined minimum weight, for example two percent of the maximum load, pressing of key 41 causes the display to be set to zero.

When the word "net" appears in area 42, the operator becomes aware that pressing of the associated key 43 will cause the net weight to be displayed. Correspondingly, activation of key 45 will cause the gross weight to be displayed. When the words "clear tare" are displayed, the operator is informed that the contents of the tare storage may be cleared.

When a tare process is required or possible, the legend "tare" will appear in area 48 (48').

Figure 4:
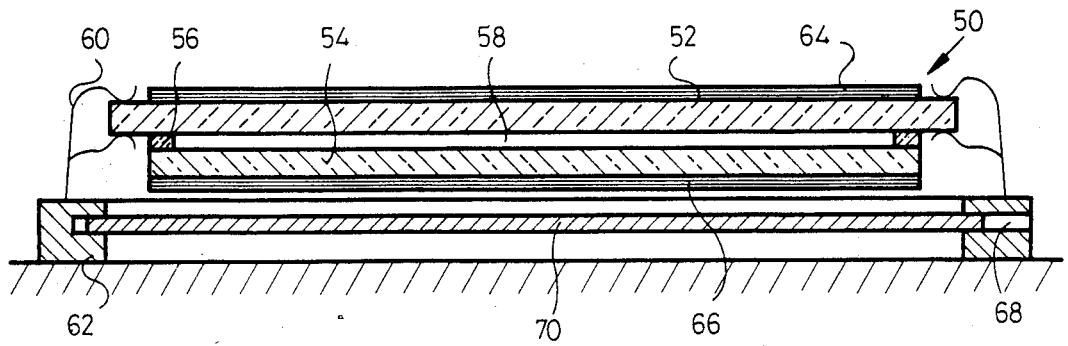
FIG. 4 is a cross section through the display.

FIG. 4 is a sectional view of the display. It consists primarily of a liquid crystal cell (LC cell) 50 of conventional construction. The type of cell chosen operates as a reflector cell with polarizers. A first and second glass plate 52 and 54 are separated by spacers 56. The liquid crystal layer 58 is located between the two spacers. The cell is retained by spring retainers 60 in base 62.

Foils constituting the polarizers (front polarizer 64, rear polarizer 66) are applied to glass plates 52 and 54. The polarizers are polarized in a direction perpendicular to one another so that the numbers and symbols or legends appear dark on a light background.

The electrodes are applied, e.g., vapor deposited, on the sides of glass plates 52 and 54 which face the liquid crystal layer. The common electrode is applied to rear glass plate 54, while the shaped electrodes are applied to front plate 52. The shaped electrodes in area 14 form the conventional seven segment indicators for displaying numbers, the sign, and the unit of measurement. The electrodes for areas 16 and 18 are rectangular and have a respective preselected area with dimensions corresponding to the dimensions of respective predetermined areas 32 . . . 48 shown in the figure.

Figure 6:
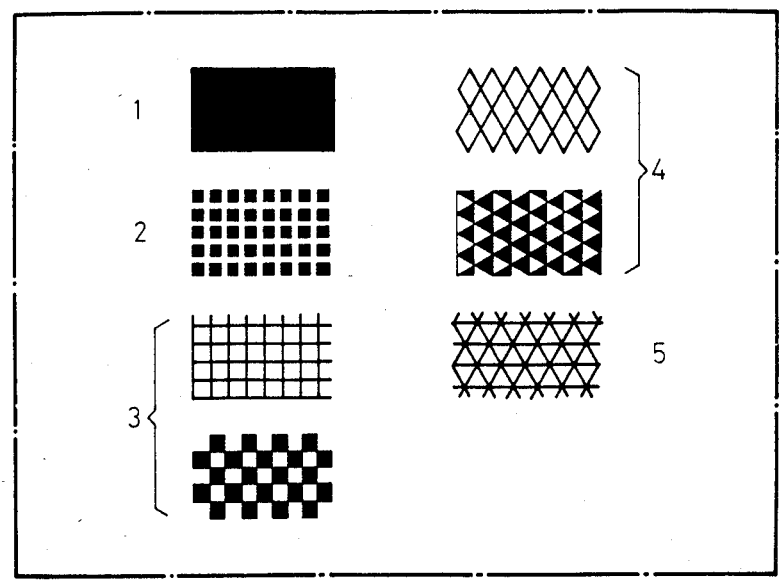
FIG. 6 illustrates a plurality of electrode configurations for improving the blocking effect of the liquid crystal.

It is possible to use solid electrodes for the electrodes associated with predetermined areas 32 . . . 48. However, such solid electrodes have been found to provide insufficient blocking and, further, to require excessive power. It is therefore preferable to use electrode configurations having a mesh pattern, each defined by a baseline, and a group of lines inclined at a predetermined angle, for example, 60° or 90°, with the baseline. The type of electrode preferred for these areas is illustrated in FIG. 6, no. 5. Electrodes such as those illustrated in FIG. 6, at no. 4 have also been found efficient, both as to light blockage and power consumption.

It will be noted that each electrode configuration, in FIG. 6, nos. 4 and 5, respectively, defines a pattern of conductive regions connected to one another, which in turn define a plurality of non-conductive zones between the conductive regions, respectively. Each non-conducting zone defines a substantially equilateral polygon, wherein two sides of each equilateral polygon subtend an acute angle therebetween, as seen from the interior of the polygon. The examples of electrode configurations illustrated at reference number 3 in FIG. 6 have been found to provide insufficient blocking, while the configuration at no. 2 would be inefficient to manufacture and operate, since each dot would require individual leads.

Figure 7:
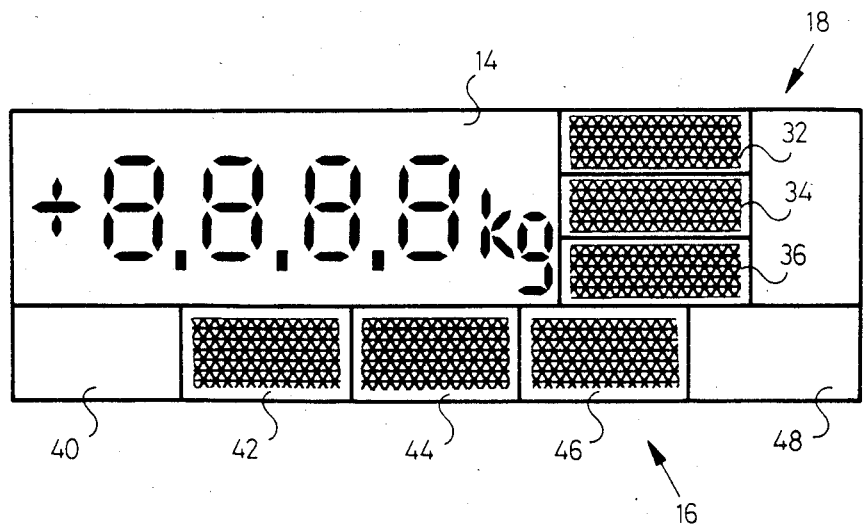
FIG. 7 shows the display of the present invention with the preferred electrode configuration from FIG. 6.

FIG. 7 shows the display of the present invention with the selected electrode configuration from FIG. 6. No electrode configuration is associated with areas 40 and 48, since the legends "zero" and "tare" are to be visible at all times. Referring again to FIG. 4, support 62 has a three sided slot 68 which is adapted to receive a reflector card 70. The reflector card constitutes an exchangeable unit, and is preferably made of aluminum, although another metal or a plastic may be used. The words "zero", "net" etc. are printed on the reflector card in preselected areas 32...48 in FIG. 3. When one of these words is to be displayed, the associated surface electrode of liquid crystal cell 50 is activated and the rectangle associated therewith changes from an opaque state to a transparent state, that is, the "window" is opened. Glass plate 52 with its surface electrodes thus constitutes blocking means.

Reflector card 70 can be pulled out of slot 68 through opening 22 (FIG. 1). Another reflector card may then be substituted, for example a card 70' shown in FIG. 5, in which all the legends or symbols of each window (32' to 48') are printed in the English language.

It must be emphasized that for one and the same scale 10 a plurality of reflector cards 70, 70' . . . may be provided. The uses to which a particular balance 10 may be put is then limited only by the electrode configuration of liquid crystal cell 50 and the electric circuitry or computer programming provided. As shown in FIG. 2, if balance 10 is to be controlled in different operating modes, each reflector card 70 can have an associated field of identifying symbols 71 in a predetermined code. These symbols are then scanned, for example photoelectrically, by a scanning unit permanently fixed in the housing of the scale and indicated by reference number 13 in FIG. 2. The scanned symbols are decoded in a decoding unit 15 and the control signals derived from the decoding process are applied to control unit 24, thereby controlling the operation of balance 10. Of course when only different languages are involved, there is no need for the identifying symbols and associated scanning and decoding equipment.

Applications for which the present invention with its exchangeable reflector cards are particularly useful include, but are not limited to:
different languages;
different scripts (Latin, Japanese, etc.);
different operating modes of the balance (e.g. computation of percentage, counting the number of units weighed, etc.);
different units of weight (if this is desired, area 14 would be subdivided to provide an additional area for display of the unit of weight).

In FIG. 3, all the "windows" are shown in an "open" state. In practice of course a number of these will be "closed", as will be illustrated in the following example which describes one operating sequence of the balance together with the corresponding display sequence:

1. Initital condition: after the weight has been put on the scale, the gross weight is displayed. Only windows 34 and 48 are "open", that is only legends in areas 34 and 48 are displayed. The operator is informed that the displayed weight is the gross weight and that it is possible to carry out a tare operation. Pressing of tare key 49 initiates the next condition.

2. The balance executes the tare command and the net weight is displayed. The following windows are now open, that is the legends are now visible in the following areas:
32: It is indicated that the displayed weight is the net weight;
36: The operator is informed that a tare operation has been carried out;
44: The operator is informed that pressing key 45 will cause the gross weight to be displayed;
46: The operator is informed that pressing key 47 will clear the tare store, simultaneously causing the displayed weight to be the gross weight;
48: The operator is advised that a (renewed) tare process is possible. When key 45 (display-gross) is activated, the third state results:

3. The gross weight is again displayed. Window 34 is open, as are windows 36, 42, 46, and 48.

Pressing of key 43 (display-net) leads to the fourth condition which corresponds to state 2.

Pressing of key 47 (clear tare) causes a return to state 1, above, including the closing of "window" 36.

Quite a few modifications and changs can be encompassed within the limits of the present invention. Other types of liquid crystal cells may be substituted for liquid crystal cells with polarizers; liquid crystal cells operating in accordance with the scattered light principle, or cells in which the type of liquid crystal layer, e.g., one of the guest/host type makes the use of polarizers unnecessary. Additionally, more than one selectively controllable area (40 . . . 48) may be associated with one or more of the keys, the then-present program controlling which of the associated windows is actually "opened". This embodiment requires fewer keys. Alternatively, the key field may be controlled by the microcomputer as a standard multiplex circuit. Another possibility is the use of combination keys, which, depending upon the selected mode of operation, may be used to enter either a number or a command into the system. Finally, the keys (41 . . . 49) may be transparent contact keys which are arranged above the associated areas or "windows", thereby allowing a substantial saving in space.

Variations are also possible regarding the light/dark contrast of the individual areas or "windows". As described above, all areas 14 have dark numbers or letters on a light field. Other arrangements may readily be provided.

Thus, when using solid electrodes as described above, it is preferred to use polarizers polarized in a direction perpendicular to one another in area 14, while in areas 16 and 18 the polarizers are polarized parallel to one another, to increase the contrast for better readability.

It might also be possible to improve the readability of the display by substituting a transparent unit for reflector card 70. If a light source is then arranged behind the transparent unit, the display will be viewed in transmitted rather than reflected light.

In another variation, polarizer 66 is not applied to glass plate 54 of liquid crystal cell 50. Instead, it is either pasted or vapor deposited on reflector card 70 in the shape of symbols or letter. In this embodiment, the same elements carry out both the polarization function and the symbol representation.

While the invention has been illustrated in a preferred embodiment, it is not to be limited to the circuits and structures shown, since many variations thereof will be evident to one skilled in the art and are intended to be encompassed in the present invention as set forth in the following claims.

We claim:
1. Display for a measuring instrument, comprising symbol carrying means carrying at least one alpha-numeric symbol in a predetermined area, said at least one alpha-numeric symbol constituting a legend to be displayed;
substantially planar blocking means having a preselected area aligned with said predetermined area, said preselected area including an electrode configuration having a light blocking or light transmissive state in accordance with the absence or presence of a control signal applied thereto, said electrode configuration defining a pattern of conductive regions connected to one another, which in turn define a plurality of non-conductive zones between said conductive regions, respectively, thereby permitting said symbol carrying means to be viewed, or covered from view, respectively,; and
means for applying said control signal to said blocking means only when said measuring instrument is in a predetermined operating condition, whereby said at least one alpha-numeric symbol is displayed only when said measuring instrument is in said predetermined operating condition, whereby both an effective light blockage, as well as a relatively low power consumption of said blocking means is realized.

2. A display as set forth in claim 1, wherein said symbol carrying means carries a plurality of groups of alpha-numeric symbols, each group located in a respective one of a plurality of predetermined areas, each of said groups constituting a legend to be displayed;

wherein said blocking means comprises a plurality of preselected areas, each aligned with a respective one of said predetermined areas, each including an electrode configuration arranged to transmit or block light from said respective one of said predetermined areas in response to a control signal applied thereto; and wherein said control signal applying means applies a plurality of control signals, each to at least one of said electrode configurations of said blocking means, each electrode configuration defining a pattern of conductive regions connected to one another, which in turn define a plurality of non-conductive zones between said conductive regions, respectively, whereby a respective group of said alpha-numeric symbols is permitted to be viewed or is covered from view, respectively.

3. A display as set forth in claim 2, wherein said blocking means comprises a liquid crystal cell having at least a first and second polarizer.

4. A display as set forth in claim 3, wherein said symbol carrying means has a reflecting surface carrying said alpha-numeric symbols.

5. A display as set forth in claim 2, wherein said symbol carrying means is an exchangeable unit.

6. A display as set forth in claim 5, wherein said symbol carrying means comprises a first and second exchangeable unit each carrying groups of alpha-numeric symbols constituting words in a first and second language, respectively.

7. A display as set forth in claim 5, wherein said measuring instrument is operable in a first and second operating mode;

wherein said symbol carrying means comprises support and alignment means, and a first and second exchangeable unit, respectively associated with said first and second operating mode, each adapted to be inserted into said support and alignment means, at least one of said exchangeable units having identifying symbols indicative of the associated one of said operating modes; and further comprising means connected to said support and alignment means for reading said identifying symbols and controlling the operation of said measuring instrument in accordance therewith.

8. A display as set forth in claim 3, wherein said preselected areas constitute first preselected areas; and wherein said liquid crystal cell further has an additional preselected area for furnishing the measured value.

9. A display as set forth in claim 8, wherein said liquid crystal cell comprises a first pair of polarizers polarized at right angles to one another and associated with said additional preselected area, and additional pairs of polarizers polarized parallel to one another and associated with said first preselected areas.

10. A display a set forth in claim 2, wherein each of said preselected areas of said blocking means has a baseline; and wherein said electrode configuration comprises a group of lines inclined at a predetermined angle to said baseline.

11. A display as set forth in claim 10, wherein said electrode configuration comprises a plurality of equilateral triangles.

12. A display as set forth in claim 2, wherein said electrode configuration comprises alternately opaque and transparent triangular regions.

13. A display as set forth in claim 3, wherein said liquid crystal cell comprises a glass plate; and wherein each of said first preselected areas of said blocking means has a electrode configuration constituted by shaped electrodes applied to said glass plate.

14. A display as set forth in claim 1, wherein said measuring instrument further comprises a plurality of keys for operator control of said operating modes of said measuring instrument including, at least in part, said control signal applying means.

15. A display as set forth in claim 1, further comprising at least one conductive lead connected to said electrode configuration.

16. A display as set forth in claim 1, wherein each non-conductive zone defines a substantially equilateral polygon, and wherein two adjoining sides of each equilateral polygon subtend an acute angle therebetween, as seen from the interior of said polygon.

17. A display as set forth in claim 1, wherein each conductive region has an area equalling at least one fifth the area of each non-conductive zone.

* * * * *